(12) United States Patent
Whewell

(10) Patent No.: US 7,880,346 B2
(45) Date of Patent: Feb. 1, 2011

(54) ELECTRICAL GENERATION APPARATUS AND PROCESS

(76) Inventor: Christopher J. Whewell, 6020 Tonkowa Trail, Georgetown, TX (US) 78628

( * ) Notice: Subject to any disclaimer, the term of this patent is extended or adjusted under 35 U.S.C. 154(b) by 171 days.

(21) Appl. No.: 12/228,789

(22) Filed: Aug. 15, 2008

(65) Prior Publication Data

US 2010/0038975 A1     Feb. 18, 2010

(51) Int. Cl.
*H02K 33/00* (2006.01)
(52) U.S. Cl. ........................................................ 310/15
(58) Field of Classification Search ................... 310/15
See application file for complete search history.

(56) References Cited

U.S. PATENT DOCUMENTS 7,227,439 B2 * 6/2007 Kelly .......................... 335/229

2004/0025949 A1 * 2/2004 Wygnaski ............... 137/624.18

FOREIGN PATENT DOCUMENTS

DE           3112892 A1 * 10/1982

OTHER PUBLICATIONS

Machine Translation of DE 3112892. Translation date : Mar. 31, 2010.*

* cited by examiner

*Primary Examiner*—Nguyen N Hanh
(74) *Attorney, Agent, or Firm*—Chris Whewell

(57) ABSTRACT

Apparati and methods for generating electricity which comprise in one embodiment a pair of stationary magnets oriented so that their like poles are facing one another with a space between them, and having a stationary length of wire disposed in the space between said magnets of said pair and enabling or causing the passing of a piece of metal through said space sufficient to cause an electrical potential in the wire. In one embodiment, the length of wire comprises a coil of wire having any number of turns between about 10 and about 5000. In another embodiment, the length of wire comprises a plurality of serpentine sections or loops disposed along the length of a tube or other form inside of which the piece of metal is made to move.

17 Claims, 4 Drawing Sheets

ELECTRICAL GENERATION APPARATUS AND PROCESS

TECHNICAL FIELD

This disclosure relates to generation of electricity from mechanical motion.

BACKGROUND OF THE INVENTION

The generation of electricity from mechanical motion has been known since at least the construction of "Faraday's Disc" by M. Faraday in the early part of the 19$^{th}$ century. Since that time a number of devices have been contrived for generating electrical energy from mechanical motion, including dynamos, generators, and the like, which typically employ either a moving coil of wire disposed in a magnetic field, or moving magnets disposed in proximity to a coil of wire.

SUMMARY

Apparatus for generating electrical energy from mechanical motion comprising: at least one pair of magnets; and a length of wire having a first end and a second end, wherein at least a portion of said length of wire is disposed between each magnet present in said pair of magnets. The pair of magnets and the length of wire are all maintained in a stationary position, and a piece of metal is disposed within sufficient proximity of the length of wire and configured to be moveable sufficiently such that an electrical potential is developed between the first end and the second end of the length of wire upon motion of the piece of metal.

BRIEF DESCRIPTION OF THE DRAWINGS

Embodiments of invention may take physical form in certain parts and arrangement of parts, the preferred embodiment of which will be described in detail and illustrated in the accompanying drawings which form a part hereof, and wherein.

DETAILED DESCRIPTION INCLUDING PREFERRED EMBODIMENT

Drawings are provided herein for purposes of illustration of certain exemplary embodiments only, and their inclusion shall not be construed as delimitive of this disclosure.

Figure 1:
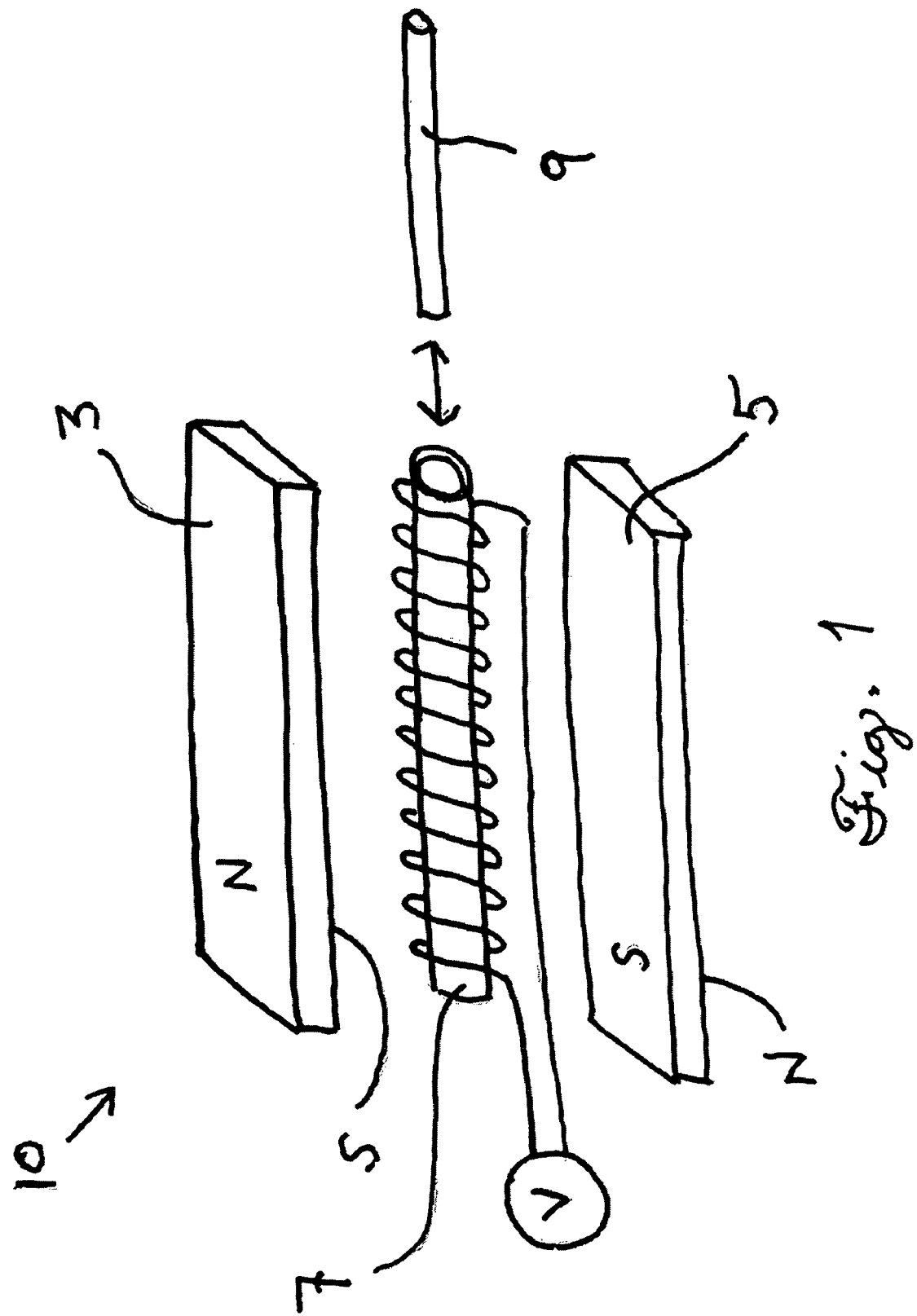
FIG. 1 is a perspective view of an arrangement useful for generating electricity in accordance with one embodiment of the present disclosure.

Referring now to the drawings, and initially to FIG. 1 there is shown an arrangement 10 useful for generating electricity from mechanical motion according to one embodiment of the disclosure.

In FIG. 1 there is a first permanent magnet 3 and a second permanent magnet 5, which in this embodiment exist in the shape of rectangular solids having faces which comprise a north pole (N) and a south pole (S), as magnets are typically known as comprising N and S poles.

Disposed between the first permanent magnet 3 and a second permanent magnet 5 is a coil of wire wound on a form 7, which form 7 is a cylindrical tube having a hollow interior portion along its length, which form 7 may be comprised of cardboard, wood, metals and alloys thereof, composite materials, or any other material known in the art as being useful for providing a form 7 onto which a coil of wire may be wound.

There is a rod 9, which in one embodiment comprises iron. To generate an electrical impulse according to the present disclosure, the rod 9 is moved into the hollow interior portion within the form 7. To generate an alternating current according to the present disclosure, the rod 9 is moved in and out of the hollow interior portion within the form 7 at any rate of motion desired, to produce an alternating current at the leads connected to the voltmeter V, the frequency of which current is directly dependent on the rate of insertion and withdrawal of the rod 9 in and out of the hollow interior portion of the form 7 around which is wound a coil of wire. Such alternating current may be rectified using a solid-state or vacuum tube diode, to provide a direct current source.

Thus, a method of generating electrical energy according to the present disclosure does not involve the motion of either a coil of wire, or of a magnet, in contradistinction to prior art methods for generating electricity.

In one embodiment, the first permanent magnet 3 and second permanent magnet 5 are oriented so that the poles on their faces are in attracting one another, with the S pole of one magnet facing the N pole of the other magnet. In a preferred embodiment, the first permanent magnet 3 and second permanent magnet 5 are oriented so that the poles on their faces are in opposition, as shown in FIG. 1, with the S poles of the two magnets facing one another. Having the N poles facing one another is an equivalent expression of the concept herein disclosed. In a preferred embodiment, the faces of the magnets are each touching opposite sides of the coil of wire. In general, it is desirable to have the two magnets closest as possible to one another while still having the coil disposed between them, in embodiments in which the faces of the magnets touching the coils are of the same pole, either both N, or both S.

Figure 2:
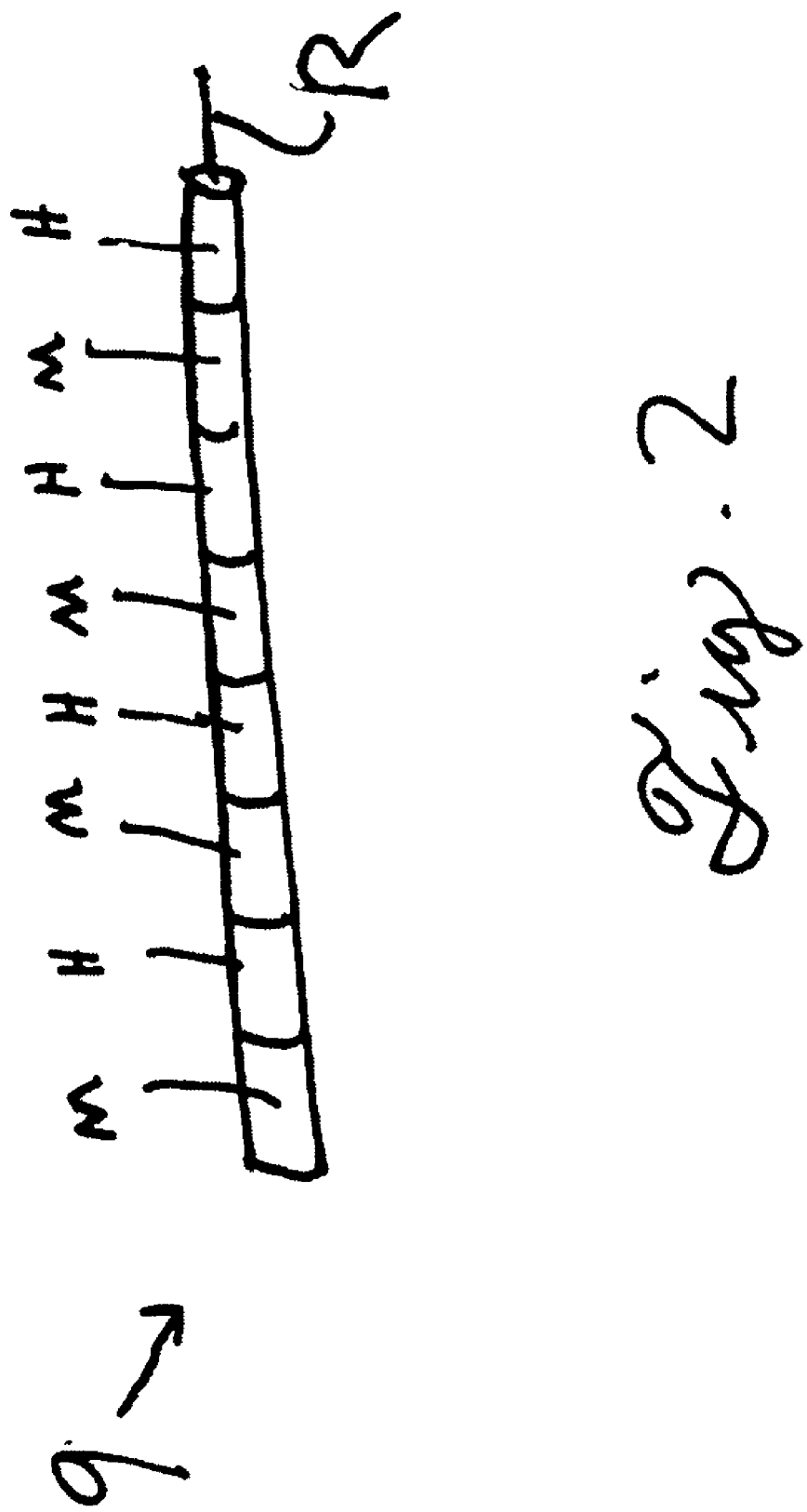
FIG. 2 is a rod useful in generating electricity in accordance with one embodiment of the present disclosure.

The rod 9 preferably comprises a ferromagnetic material, including iron, cobalt, nickel, and samarium, including any alloys comprising any of the foregoing provided that an electrical impulse is generated upon motion of the rod 9 in and out of the coil longitudinally or along the centerline of the coil's axis. The rod 9 may be of a single solid construct, such as a solid rod or bar of iron, steel or any material previously described. In alternate embodiments, as shown in FIG. 2 the rod 9 comprises alternating sections of a metal M (including those previously set forth herein) and a material H which does not cause generation of an electrical impulse upon its being inserted into and withdrawn from the coil, including non-conductors such as wood, plastics, cellulosic materials, and even metals such as copper and aluminum. To construct a rod 9 as shown in FIG. 2, in one embodiment, one begins with a threaded rod R and a plurality of cylinders of materials comprising M and H, each of which have a hole disposed along their axes sufficient to enable the threaded rod R to be inserted in the cylinders of material. The cylinders M and H are alternately disposed on the threaded rod R as shown and the ends fastened such as by placing an ordinary nut on each of the ends of the threaded rod R; however, any conventional means of attachment may be employed, including welding, rivets, etc. In one embodiment, the sections labeled M are comprised of steel, and the sections labeled H are comprised of polypropylene.

Figure 3:
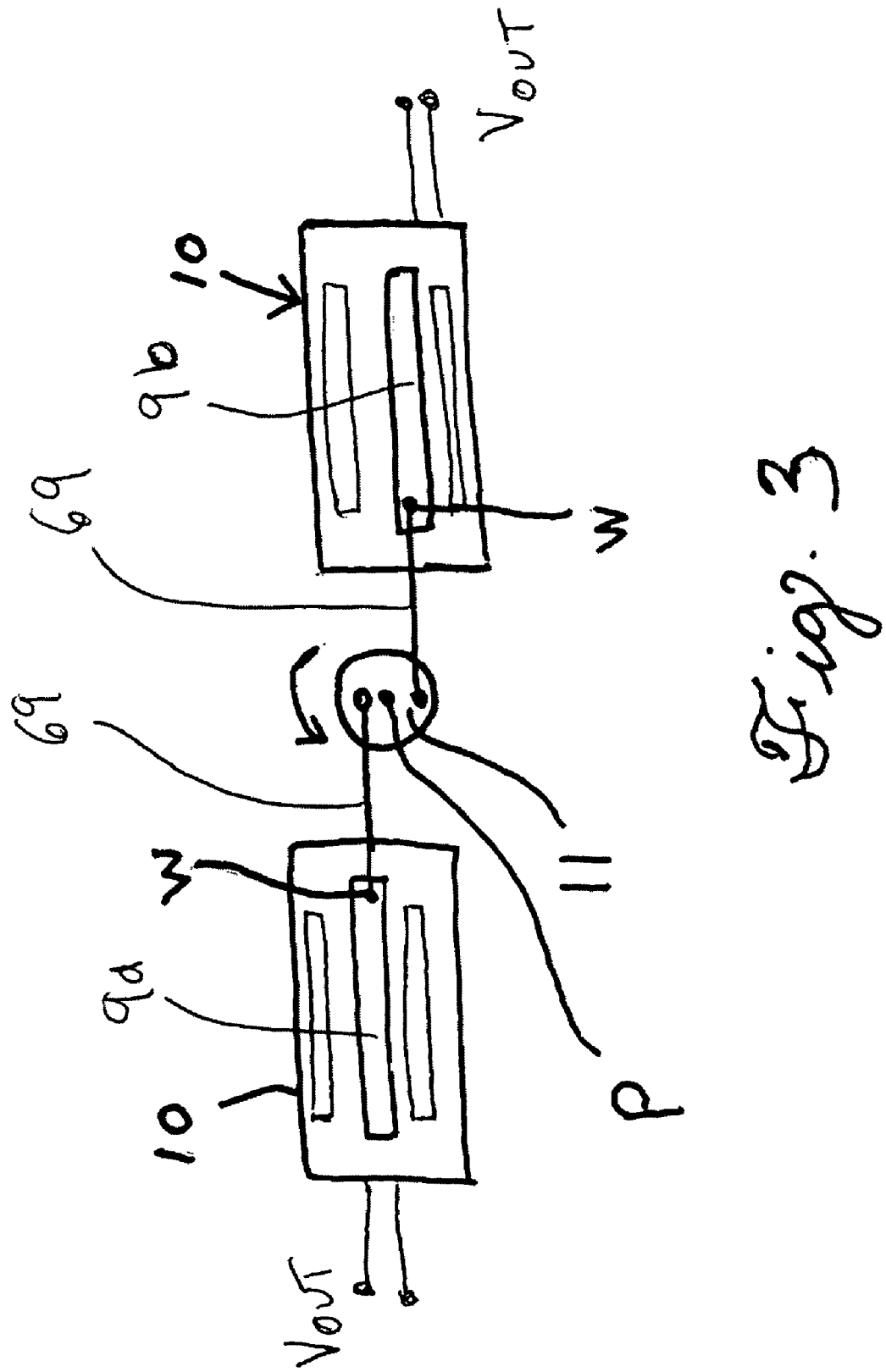
FIG. 3 is a schematic view of one arrangement useful for generating electricity from reciprocating motion according to the present disclosure.

In FIG. 3 is shown one possible schematic arrangement of a plurality of arrangements 10 useful for generating electricity according to this disclosure. There is provided a rotatable disc 11 which functions as a cam, to which are attached the rods 9a, 9b which are an element of the arrangements 10. Each of the rods 9a, 9b are attached to the rotatable disc 11 via a connecting rod 69 which includes at one end a pivot W that is analogous to the wrist pin of an internal combustion engine. The other end of each of the connecting rods is pivotally attached to the rotatable disc 11 sufficiently so that upon rotation of the disc 11 the connecting rods 69 do not interfere, such as having each connecting rod 9 being offset with respect to one another and the plane of the surface of the disc 11. Upon rotation of the disc 11, the rods 9a, 9b are inserted and withdrawn into the coils of each of the arrangements 10 to produce a voltage at the leads labeled $V_{OUT}$, which are the leads to the coil disposed within each arrangement 10. The voltage put out may be processed by methods known in the art, including connecting the coils from each of the arrangements 10 in series or parallel, employing rectifying diodes, capacitors and chokes to process the voltage, and storing the energy so provided in a storage battery such as NiCd cells or lead acid batteries or the like.

Although two arrangements 10 were shown and described herein with reference to FIG. 3, the present disclosure includes addition of more arrangements to the cam-driven setup described. Additionally, any mechanism for providing reciprocating motion known in the art may be used in conjunction with the principle upon which generation of electrical energy according to this disclosure is carried out.

Figure 4:
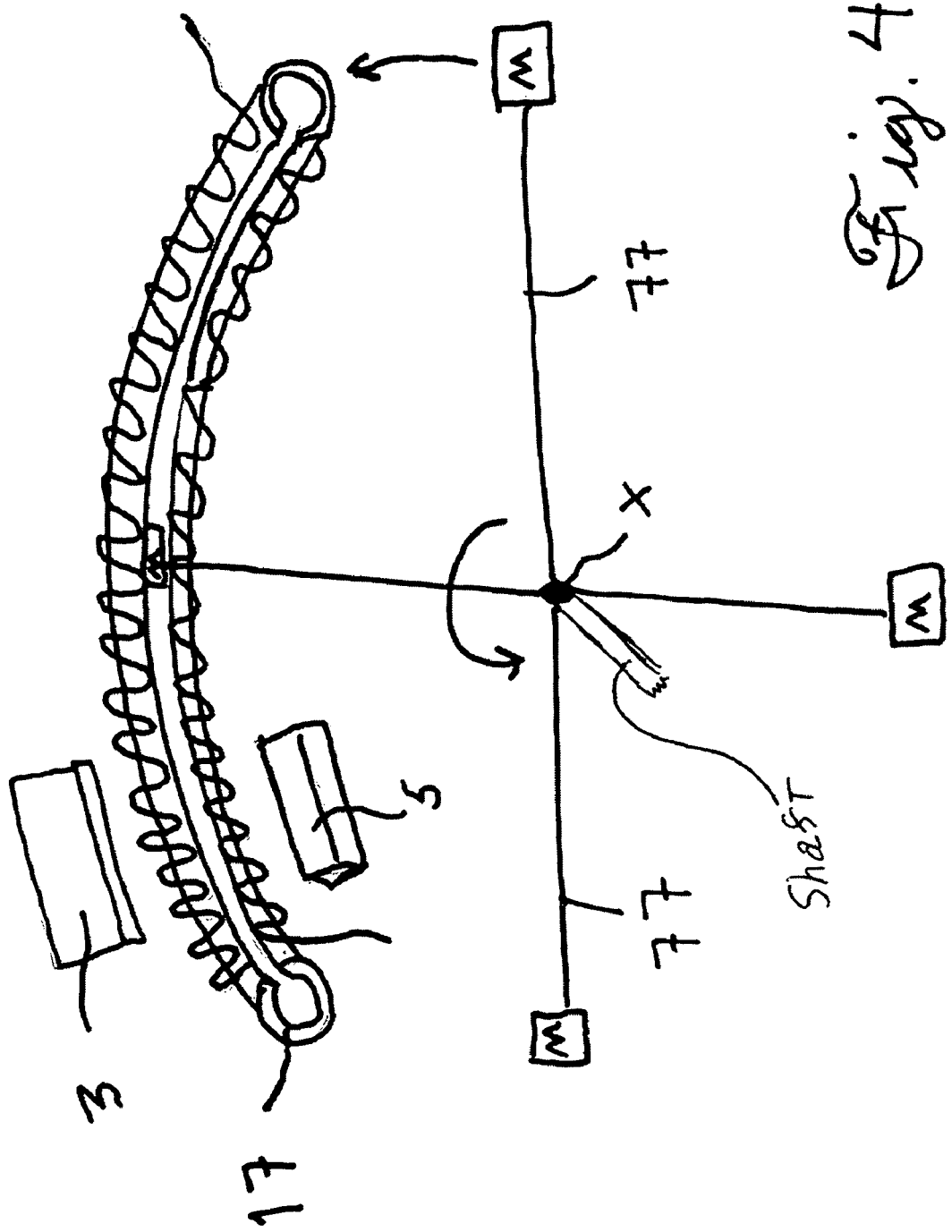
FIG. 4 is a schematic view of an arrangement useful for generating electricity from continuous or non-continuous circular motion according to the present disclosure.

FIG. 4 shows an arrangement for generating electricity according to one alternate embodiment of the disclosure, wherein a circular tube 17 is provided with a cut along its length to enable a support rod 77 to transit along the length of the tube 17. Disposed at each of the ends of a plurality of support rods 77 is a metal M as described earlier. There are loops of wire disposed along the length of the tube 17 and the ends of the wire are again the points at which electrical energy may be derived, when a plurality of support rods 77 are connected to one another as shown and the whole assembly is rotated about the point X. This causes the slugs of metal M to move through the tube traversing the loops of wire that are disposed in the magnetic field between the magnets 3 and 5 to generate electricity, the frequency and voltage depending on the speed of rotation, the number of loops of wires and the strength of the magnets. Although only a section of tube 17 is shown, the present disclosure includes embodiments wherein the tube 17 is a complete circular loop. A plurality of pairs of magnets such as 3, 5 may be disposed at any locations desired along the tubes' length. In this fashion, continuous rotational motion may be converted to electricity according to the disclosure, such as by affixing a shaft to point X, wherein the shaft is commonly connected to a water wheel, combustion engine, steam engine, or windmill.

An apparatus and method as herein described may be employed in the place of conventional electrical generation means, including without limitation, wind-generators.

While the invention has been described by reference to certain embodiments, it should be understood that changes can be made within the spirit and scope of the inventive concepts described. This includes subject matter defined by any combination of any one of the various claims appended hereto with any one or more of the remaining claims, including the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claims so modified. This also includes combination of the features and/or limitations of one or more of the independent claims with features and/or limitations of another independent claims to arrive at a modified independent claim, with the remaining dependent claims in their original text being read and applied to any independent claim so modified. Accordingly, it is intended that the invention not be limited to the disclosed embodiments, but that it have the full scope permitted by the language of the following claims.

The invention claimed is:

1. Apparatus for generating electrical energy from mechanical motion comprising:
   at least one pair of magnets, said magnets being oriented with only like poles facing one another, and wherein a space exists between said like poles, the magnets' remaining poles being oriented so as to not face one another;
   a length of wire having a first end and a second end, wherein a predominant portion of said length of wire is disposed in said space, said pair of magnets and said length of wire all being maintained in a stationary position,
   a piece of metal, disposed within sufficient proximity of said length of wire and configured to be moveable sufficiently such that an electrical potential is developed between said first end and said second end of said length of wire upon motion of said piece of metal.

2. Apparatus according to claim 1 wherein said length of wire comprises a plurality of loops of wire.

3. Apparatus according to claim 1 wherein said length of wire comprises a coil of wire.

4. Apparatus according to claim 3 wherein said coil of wire comprises a plurality of turns of wire.

5. Apparatus according to claim 4 wherein said turns are wrapped on a form.

6. Apparatus according to claim 5 wherein said form is selected from the group consisting of: tubular forms and circular forms.

7. Apparatus according to claim 1 wherein said piece of metal comprises a rod.

8. Apparatus according to claim 1 wherein said magnets comprise permanent magnets.

9. Apparatus according to claim 1 wherein said magnets comprise electromagnets.

10. Apparatus according to claim 1 wherein said piece of metal comprises a metal selected from the group consisting of: iron, cobalt, nickel, samarium and any alloy comprising at least one of the foregoing.

11. Apparatus according to claim 10 wherein said piece of metal comprises a rod.

12. Apparatus according to claim 11 wherein said rod is a solid rod.

13. Apparatus according to claim 11 wherein said rod comprises an alternating plurality of ferro-magnetic and non-ferromagnetic sections.

14. Apparatus according to claim 1 wherein said piece of metal is fixedly attached to a rotatable construct having a center of rotation which is attached to a shaft.

15. Apparatus according to claim 14 wherein said rotatable construct includes a plurality of pieces of metal fixedly attached thereto.

16. A method for generating an electrical potential in a wire which comprises:
- providing at least one pair of magnets said magnets being oriented with only like poles facing one another, and wherein a space exists between said like poles, the magnets' remaining poles being oriented so as to not face one another;
- providing a length of wire having a first end portion and a second end portion, wherein a substantial portion of said length of wire is disposed in said space disposed between said magnets of said pair;
- providing that said at least one pair of magnets and said length of wire remain in a stationary position; and
- causing motion of a piece of metal in the space disposed between said magnets of said pair and in sufficient proximity to said wire to generate a measurable electrical potential at the ends of said wire.

17. A method according to claim 16 wherein said length of wire comprises a coil of wire having a plurality of turns.

* * * * *